(12) United States Patent
Woo et al.

(10) Patent No.: US 12,345,540 B2
(45) Date of Patent: Jul. 1, 2025

(54) VEHICLE AND METHOD OF CONTROLLING THE SAME

(71) Applicants: Hyundai Motor Company, Seoul (KR); Kia Corporation, Seoul (KR)

(72) Inventors: Seunghyun Woo, Seoul (KR); Jae Yul Woo, Seoul (KR); Rowoon An, Seoul (KR); Soobin Kim, Seoul (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 499 days.

(21) Appl. No.: 17/807,301

(22) Filed: Jun. 16, 2022

(65) Prior Publication Data

US 2023/0160711 A1   May 25, 2023

(30) Foreign Application Priority Data

Nov. 19, 2021   (KR) .................. 10-2021-0160548

(51) Int. Cl.
*G01C 21/36* (2006.01)

(52) U.S. Cl.
CPC ....... *G01C 21/365* (2013.01); *G01C 21/3602* (2013.01); *G01C 21/3632* (2013.01);
(Continued)

(58) Field of Classification Search
CPC .............. G01C 21/365; G01C 21/3602; G01C 21/3632; G01C 21/3638; G01C 21/3647; G01C 21/367; G01C 21/30; B60W 50/14; B60W 30/18163; B60W 40/02; B60W 40/105; B60W 2050/146; B60W 2520/10; B60W 2556/45; B60W 2720/10;
(Continued)

(56) References Cited

U.S. PATENT DOCUMENTS

| 8,521,411 | B2 * | 8/2013 | Grabowski | ........ G02B 27/0101 701/454 |
| 11,715,233 | B2 * | 8/2023 | Woo | ...................... G01S 19/485 345/633 |

(Continued)

FOREIGN PATENT DOCUMENTS

| KR | 101957446 B1 | 6/2019 |
| KR | 102222102 B1 | 3/2021 |

(Continued)

*Primary Examiner* — Mussa A Shaawat
(74) *Attorney, Agent, or Firm* — Slater Matsil, LLP

(57) ABSTRACT

In an embodiment a vehicle includes a communication module, a display module, an image sensor configured to acquire a front image of the vehicle and a controller configured to determine that the vehicle enters a predetermined range of a destination based on a global positioning system (GPS) signal received through the communication module, compare a feature point of the front image of the vehicle with point cloud map information to determine a first predicted position of the vehicle, based on a difference between the first predicted position and a second predicted position of the vehicle indicated by the GPS signal, determine one of the first predicted position and the second predicted position as a position of the vehicle and control the display module to display an augmented reality (AR) image for performing a route guidance to the destination based on the determined position of the vehicle.

19 Claims, 9 Drawing Sheets

(52) U.S. Cl.
CPC ..... *G01C 21/3638* (2013.01); *G01C 21/3647* (2013.01); *G01C 21/367* (2013.01)

(58) Field of Classification Search
CPC ........ B60K 35/00; B60K 35/22; B60K 35/28; B60K 35/81
See application file for complete search history.

(56) References Cited

U.S. PATENT DOCUMENTS

| | | | | |
|---|---|---|---|---|
| 2006/0293843 | A1* | 12/2006 | Morita | G01C 21/30 701/442 |
| 2007/0021912 | A1* | 1/2007 | Morita | G01C 21/3602 701/431 |
| 2007/0225907 | A1* | 9/2007 | Oonishi | G01C 21/3658 701/411 |
| 2010/0121518 | A1* | 5/2010 | Tiernan | G01C 21/165 701/533 |
| 2010/0299063 | A1* | 11/2010 | Nakamura | G06V 20/588 701/532 |
| 2014/0266656 | A1* | 9/2014 | Ng-Thow-Hing | G08G 1/166 340/435 |
| 2015/0204687 | A1* | 7/2015 | Yoon | G06T 19/006 701/436 |
| 2018/0164817 | A1* | 6/2018 | Herz | B62D 15/0285 |
| 2018/0172455 | A1* | 6/2018 | Yamaguchi | G05D 1/02 |
| 2018/0225875 | A1* | 8/2018 | Yasrebi | G06F 3/011 |
| 2018/0328752 | A1* | 11/2018 | Tomatsu | G06T 19/006 |
| 2019/0033867 | A1* | 1/2019 | Sharma | G06T 7/73 |
| 2019/0051056 | A1* | 2/2019 | Chiu | G06F 16/903 |
| 2020/0149916 | A1 | 5/2020 | Yu et al. | |
| 2020/0189390 | A1* | 6/2020 | Viswanathan | G01C 21/3837 |
| 2021/0010814 | A1* | 1/2021 | Demir | G01C 21/28 |
| 2021/0049925 | A1* | 2/2021 | Robinson | G02B 27/0093 |
| 2021/0088351 | A1 | 3/2021 | Kassner et al. | |
| 2021/0142526 | A1* | 5/2021 | Mantyjarvi | B60W 50/14 |
| 2021/0207971 | A1 | 7/2021 | Kim et al. | |
| 2022/0155075 | A1* | 5/2022 | Jeon | G01C 21/1656 |
| 2022/0236069 | A1* | 7/2022 | Yang | G06V 20/56 |
| 2023/0111436 | A1* | 4/2023 | Petit | B60K 35/00 340/902 |

FOREIGN PATENT DOCUMENTS

| | | |
|---|---|---|
| KR | 20210085834 A | 7/2021 |
| KR | 20210087271 A1 | 7/2021 |

\* cited by examiner

VEHICLE AND METHOD OF CONTROLLING THE SAME

CROSS-REFERENCE TO RELATED APPLICATIONS

This application claims the benefit of Korean Patent Application No. 10-2021-0160548, filed on Nov. 19, 2021, which application is hereby incorporated herein by reference.

TECHNICAL FIELD

The disclosure relates to a vehicle for guiding a route to a destination and a method of controlling the same.

BACKGROUND

In general, a vehicle uses a global positioning system (GPS) signal to inform an exact distance and a required time from a current position to a destination, and guide a route to the destination.

However, due to the characteristics of the GPS signal, errors may occur in determining the position of the vehicle, and the route guidance may be terminated before reaching the destination.

In addition, when an augmented reality (AR) image is used for route guidance, such an error with the position determination of the vehicle may prevent the AR image from being mapped to the correct position, which may cause inconvenience to the user.

SUMMARY

Embodiment provide a vehicle and a method of controlling the same that are capable of, when entering a predetermined range of a destination, determining a predicted position of the vehicle using point cloud map information, comparing the predicted position with a predicted position of the vehicle indicated by a global positioning system (GPS) signal to determine a more accurate position of the vehicle, thereby, e.g., more accurately guiding a route to the destination in the last mile.

According to an embodiment a vehicle includes a communication module; a display module; an image sensor configured to acquire a front image of the vehicle; and a controller configured to, when it is determined that the vehicle enters a predetermined range of a destination based on a global positioning system (GPS) signal received through the communication module, compare a feature point of the front image of the vehicle with point cloud map information to determine a first predicted position of the vehicle, and based on a difference between the first predicted position and a second predicted position of the vehicle indicated by the GPS signal, determine one of the first predicted position and the second predicted position as a position of the vehicle, and control the display module to display an augmented reality (AR) image for performing a route guidance to the destination based on the determined position of the vehicle.

The controller may be configured to, in response to determining that the vehicle enters the predetermined range of the destination, compare a speed of the vehicle with a predetermined speed, and determine the first predicted position when the speed of the vehicle is less than or equal to the predetermined speed.

The controller may be configured to, in response to determining that the vehicle enters the predetermined range of the destination, control the communication module to transmit the front image of the vehicle to an external server, and determine a position indicated by position information received from the external server through the communication module as the first predicted position.

The controller may be configured to, when a distance between the first predicted position and the second predicted position is less than a predetermined error distance, determine the second predicted position as the position of the vehicle.

The controller may be configured to, when a distance between the first predicted position and the second predicted position is greater than or equal to a predetermined error distance, determine the first predicted position as the position of the vehicle.

In the determining of the first predicted position as the position of the vehicle, the controller may be configured to determine, as the position of the vehicle, the first predicted position determined for a predetermined time in real time.

The controller may be configured to control the display module to display a turn by turn (TBT) preview image, which guides a moving direction on at least one junction adjacent to the determined position of the vehicle among a plurality of junctions located between the determined position of the vehicle and the destination, to be overlaid on the front image of the vehicle.

The controller may be configured to, when it is determined that, based on the determined position of the vehicle, the vehicle has entered a predetermined range of a junction located on a route to the destination, control the display module to display a first AR image in a shape of an arrow pointing to a moving direction at the junction to be overlaid on the front image of the vehicle.

The controller may be configured to control the display module to display a second AR image in a shape of a carpet covering a ground surface of a travel lane at the determined position of the vehicle to be overlaid on the front image of the vehicle, and adjust at least one of a color or a transparency of the second AR image based on a speed of the vehicle.

The controller may be configured to, when changing lanes of the vehicle, determine the second AR image in a shape that connects a ground surface of a travel lane before the lane change and a ground surface of a travel lane after the lane change.

According to an embodiment a method for controlling a vehicle includes a communication module, a display module, and an image sensor for acquiring a front image of the vehicle, the method including: when it is determined that the vehicle enters a predetermined range of a destination based on a global positioning system (GPS) signal received through the communication module, comparing a feature point of the front image of the vehicle with point cloud map information to determine a first predicted position of the vehicle; based on a difference between the first predicted position and a second predicted position of the vehicle indicated by the GPS signal, determining one of the first predicted position and the second predicted position as a position of the vehicle; and controlling the display module to display an augmented reality (AR) image for performing a route guidance to the destination based on the determined position of the vehicle.

The determining of the first predicted position may include, in response to determining that the vehicle enters the predetermined range of the destination, comparing a speed of the vehicle with a predetermined speed, and determining the first predicted position when the speed of the vehicle is less than or equal to the predetermined speed.

The determining of the first predicted position may include: in response to determining that the vehicle enters the predetermined range of the destination, controlling the communication module to transmit the front image of the vehicle to an external server; and determining a position indicated by position information received from the external server through the communication module as the first predicted position.

The determining of one of the first predicted position and the second predicted position as the position of the vehicle may include, when a distance between the first predicted position and the second predicted position is less than a predetermined error distance, determining the second predicted position as the position of the vehicle.

The determining of one of the first predicted position and the second predicted position as the position of the vehicle may include, when a distance between the first predicted position and the second predicted position is greater than or equal to a predetermined error distance, determining the first predicted position as the position of the vehicle.

The method may further include, in the determining of the first predicted position as the position of the vehicle, determining, as the position of the vehicle, the first predicted position determined for a predetermined time in real time.

The method may further include controlling the display module to display a turn by turn (TBT) preview image, which guides a moving direction on at least one junction adjacent to the determined position of the vehicle among a plurality of junctions located between the determined position of the vehicle and the destination, to be overlaid on the front image of the vehicle.

The controlling of the display module to display the AR image may include, when it is determined that, based on the determined position of the vehicle, the vehicle has entered a predetermined range of a junction located on a route to the destination, controlling the display module to display a first AR image in a shape of an arrow pointing to a moving direction at the junction to be overlaid on the front image of the vehicle.

The controlling of the display module to display the AR image includes controlling the display module to display a second AR image in a shape of a carpet covering a ground surface of a travel lane at the determined position of the vehicle to be overlaid on the front image of the vehicle, and adjusting at least one of a color or a transparency of the second AR image based on a speed of the vehicle.

The controlling of the display module to display the AR image may include, when changing lanes of the vehicle, determining the second AR image in a shape that connects a ground surface of a travel lane before the lane change and a ground surface of a travel lane after the lane change.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION OF ILLUSTRATIVE EMBODIMENTS

Figure 1:
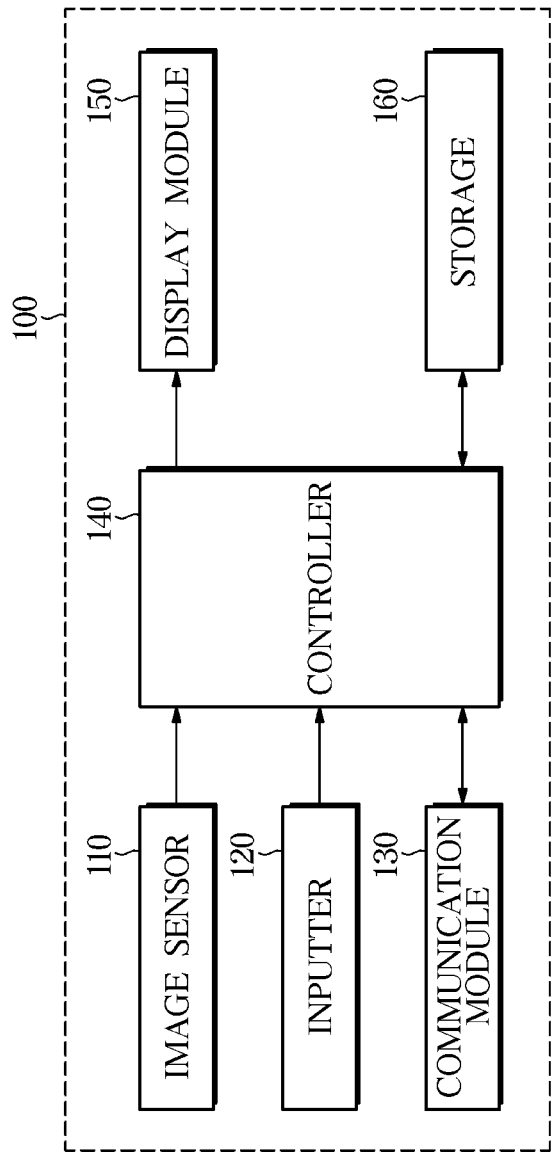
FIG. 1 is a control block diagram illustrating a vehicle according to an embodiment.

Like numerals refer to like elements throughout the specification. Not all elements of embodiments of the present disclosure will be described, and description of what are commonly known in the art or what overlap each other in the embodiments will be omitted.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, As used herein, the singular forms "a," "an" and "the" are intended to include the plural forms as well, unless the context clearly indicates otherwise.

The terms, such as "~part", "~device", "~block", "~member", "~ module", and the like may refer to a unit for processing at least one function or act. For example, the terms may refer to at least process processed by at least one hardware, such as field-programmable gate array (FPGA)/application specific integrated circuit (ASIC), software stored in memories, or processors.

Reference numerals used for method steps are just used for convenience of explanation, but not to limit an order of the steps. Thus, unless the context clearly dictates otherwise, the written order may be practiced otherwise.

Hereinafter, an embodiment of a vehicle and a method of controlling the same according to an aspect will be described in detail with reference to the accompanying drawings.

FIG. 1 is a control block diagram illustrating a vehicle according to an embodiment.

Referring to FIG. 1, a vehicle 100 according to an embodiment may an image sensor no for acquiring a front image of the vehicle 100, an input module 120 for receiving an input from a user, a communication module 130 for communicating with an external device, a controller 140 for controlling a route guidance function, a display module 150 for displaying a front image and an augmented reality (AR) image for route guidance, and a storage 160 for storing various types of information for the route guidance function.

The image sensor no according to the embodiment may be provided as an image sensor generally known in the art, and acquire a front image of the vehicle 100.

The input module 120 according to the embodiment may receive an input from a user, for example, may receive a destination from the user as an input. The input module 120 may be provided as an input device generally known in the art, and according to an embodiment, may be a touch panel integrally formed with the display module iso.

The communication module 130 according to the embodiment may be provided as a communication module generally known in the art capable of performing communication with an external device. For example, the communication module 130 may receive a global positioning system (GPS) signal from a satellite, and may perform wireless communication with an external server.

The controller 140 according to the embodiment may guide a route to a destination input from the user, based on a GPS signal received through the communication module 130.

Specifically, the controller 140 may determine the position of the vehicle 100 based on the GPS signal, and determine a route from the position of the vehicle 100 to the destination based on map information stored in the storage 160 or map information received from the external server. In this case, the route to the destination may be determined according to a method generally known in the art. For example, the route to the destination may be determined based on a shortest distance, a shortest time, a user's usage history, or another user's usage history.

In addition, the controller 140 may display an AR image guiding a route to the determined destination to be overlaid on the front image.

Specifically, the controller 140 may control the display module 150 to display a turn by turn (TBT) preview image, which guides a moving direction on at least one junction adjacent to the position of the vehicle 100 among a plurality of junctions located between the position of the vehicle 100 and the destination, to be overlaid on the front image.

In addition, the controller 140 may, when it is determined, based on the position, that the vehicle 100 has entered an area within a predetermined range of a junction located on a route to the destination, control the display module 150 to display a first AR image in the shape of an arrow pointing in a moving direction at the junction to be overlaid on the front image.

In addition, the controller 140 may control the display module 150 to display a second AR image in the shape of a carpet covering the ground surface of a travel lane at the position of the vehicle 100 to be overlaid on the front image. In this case, the controller 140 may adjust at least one of a color or a transparency of the second AR image based on the speed of the vehicle 100. In addition, according to an embodiment, the controller 140 may be configured to, in changing lanes of the vehicle 100, determine the second AR image in a shape that connects the ground surface of a travel lane before the lane change and the ground surface of a travel lane after the lane change.

The controller 140 according to the embodiment may, when it is determined that the vehicle enters a predetermined range of a destination based on a GPS signal, compare a feature point of the front image with point cloud map information to determine a first predicted position of the vehicle 100. In this case, the feature point may refer to a point capable of specifying the shape of an object, such as an edge of an object.

In addition, the controller 140 may determine one of the first predicted position and a second predicted position of the vehicle 100 indicated by the GPS signal as the position of the vehicle based on a difference between the first predicted position and the second predicted position, and control the display module 150 to display an AR image for performing a route guidance to the destination based on the determined position.

The controller 140, according to an embodiment may, in response to determining that the vehicle 100 enters a predetermined range of a destination, compare the speed of the vehicle 100 with a predetermined speed, and determine the first predicted position when the speed of the vehicle is less than or equal to the predetermined speed.

In addition, the controller, according to an embodiment, may, in response to determining that the vehicle 100 enters a predetermined range of a destination, control the communication module 130 to transmit the front image to the external server, and determine a position indicated by position information received from the external server through the communication module 130 as the first predicted position.

The controller 140 may, when the distance between the first predicted position and the second predicted position is less than a predetermined error distance, determine the second predicted position as the position of the vehicle 100.

In addition, the controller 140 may, when the distance between the first predicted position and the second predicted position is greater than or equal the predetermined error distance, determine the first predicted position as the position of the vehicle 100.

The controller 140 according to the embodiment may, when the vehicle 100 is located within a predetermined range from a destination, determine and compare the first predicted position and the second predicted position in real time, to determine the position of the vehicle 100.

In addition, the controller 140, according to an embodiment may, in the determining of the first predicted position as the position of the vehicle 100, determine, as the position of the vehicle 100, the first predicted position determined for a predetermined time in real time.

The controller 140 may include at least one memory in which a program for performing the above-described operations and operations to be described below is stored, and at least one processor for executing the stored program. When the memory and the processor are plural, the memories and the processors may be integrated into one chip or may be provided in physically separate positions.

The display module 150 according to the embodiment may display a front image under the control of the controller 140, and may display an AR image for route guide to be overlaid on the front image. To this end, the display module 150 may be provided as a display panel generally known in the art.

The storage 160 according to the embodiment may store various types of information required for route guidance. For example, the storage 160 may include map information for route guidance, and in particular, may include point cloud map information.

The point cloud map information may correspond to map information including a point cloud representing the shape of a road and a point cloud representing the shape of an object around a road (e.g., buildings, traffic lights, trees, signs, etc.). In this case, the point cloud may be generated by extracting feature points from sensing data obtained through a scanning device (e.g., a 360-degree image sensor, etc.) and forming a set of extracted feature points.

In the above, each configuration of the vehicle 100 has been described. Hereinafter, an example of the vehicle 100 performing a route guidance in the last mile will be described in detail.

Figure 2:
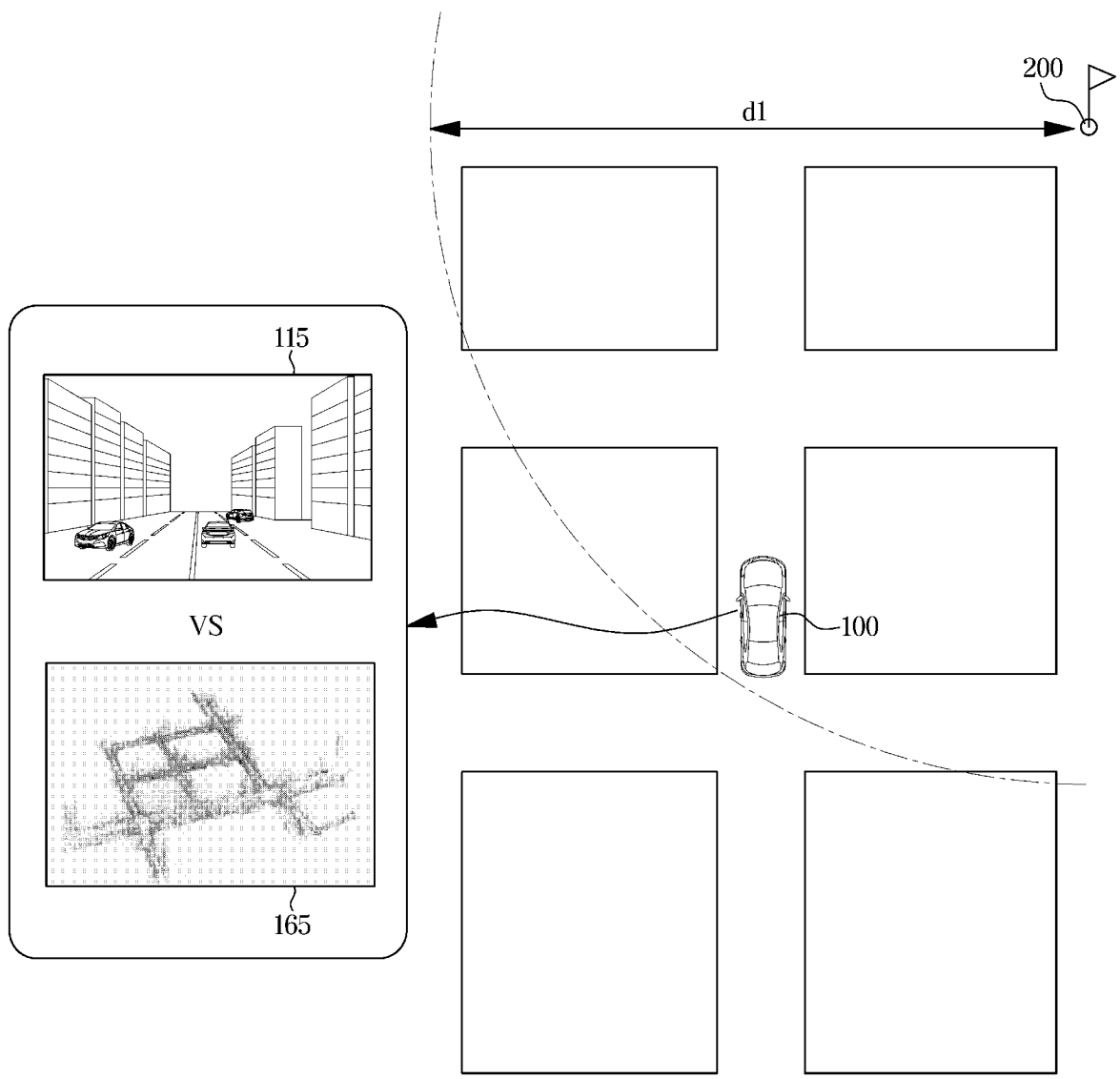
FIG. 2 illustrates a case in which point cloud map information is provided when a vehicle enters a predetermined range of a destination according to an embodiment.

FIG. 2 illustrates a case in which point cloud map information is used when a vehicle 100 enters a predetermined range of a destination according to an embodiment.

Referring to FIG. 2, the vehicle 100 according to the embodiment may guide a route to a destination 200 input from a user based on a GPS signal received through the communication module 130.

In this case, the vehicle 100 may determine that the vehicle 100 enters a predetermined range $d_1$ of the destination 200 based on the GPS signal. Specifically, the vehicle 10 may determine that the vehicle 100 enters the predetermined range $d_1$ on the destination 200 when the position of the vehicle 100 indicated by the GPS signal is within the predetermined range $d_1$ of the destination 200.

In this case, the vehicle 100 may compare feature points of the front image 115 with point cloud map information 165 to determine a predicted position of the vehicle 100.

The point cloud map information may correspond to map information including a point cloud representing the shape of a road and a point cloud representing the shape of an object around a road (e.g., buildings, traffic lights, trees, signs, etc.). In this case, the point cloud may be generated by extracting feature points from sensing data obtained through a scanning device (e.g., a 360-degree image sensor, etc.) and forming a set of extracted feature points.

The vehicle 100 may compare feature points of the front image 115 with feature points of the point cloud map information 165, and determine the position indicated by feature points, among the feature points of the point cloud map information 165, which coincide with the feature points of the front image 115 as a predicted position of the vehicle 100.

Figure 3:
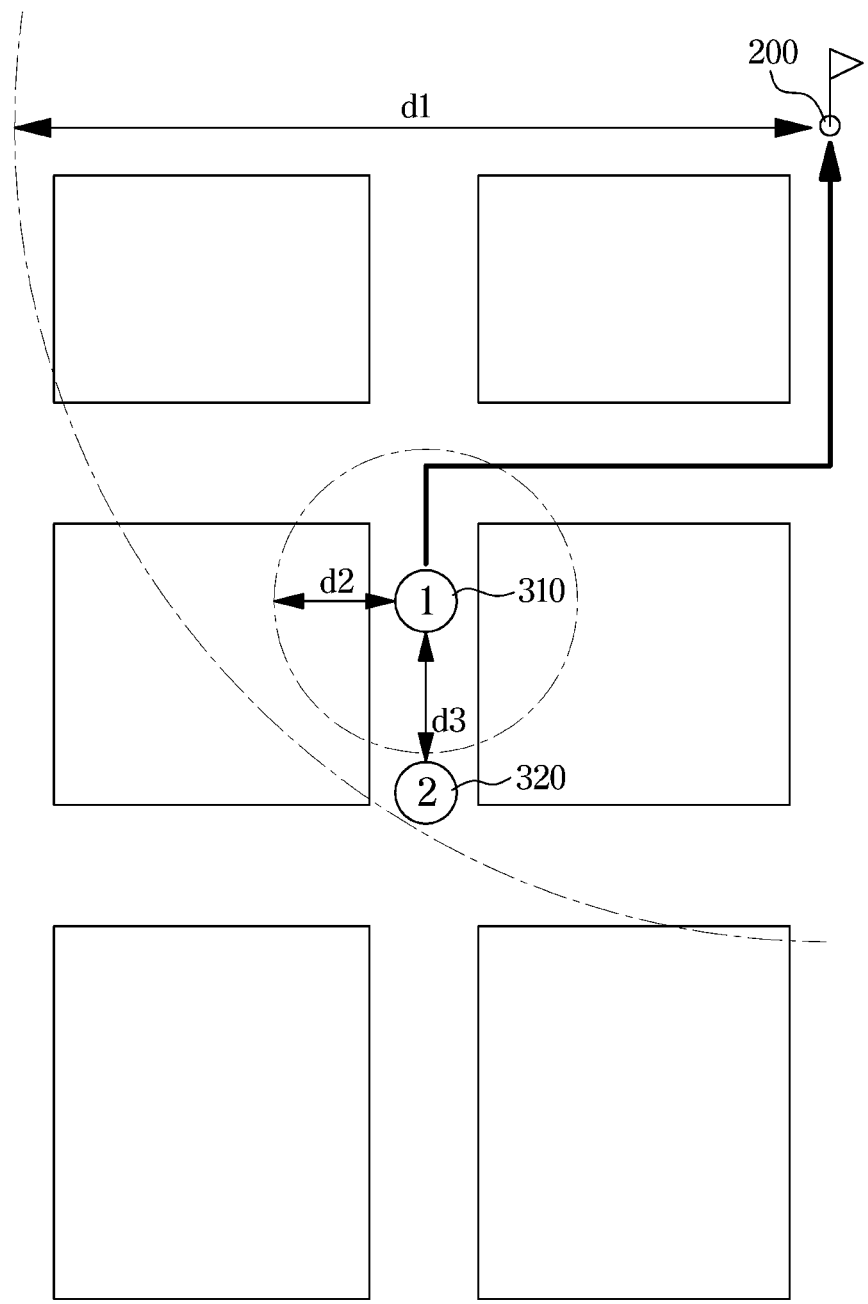
FIGS. 3 and 4 illustrate a case in which a predicted position based on point cloud map information and a predicted position indicated by a global positioning system (GPS) signal are compared with each other by a vehicle according to an embodiment.
Figure 4:
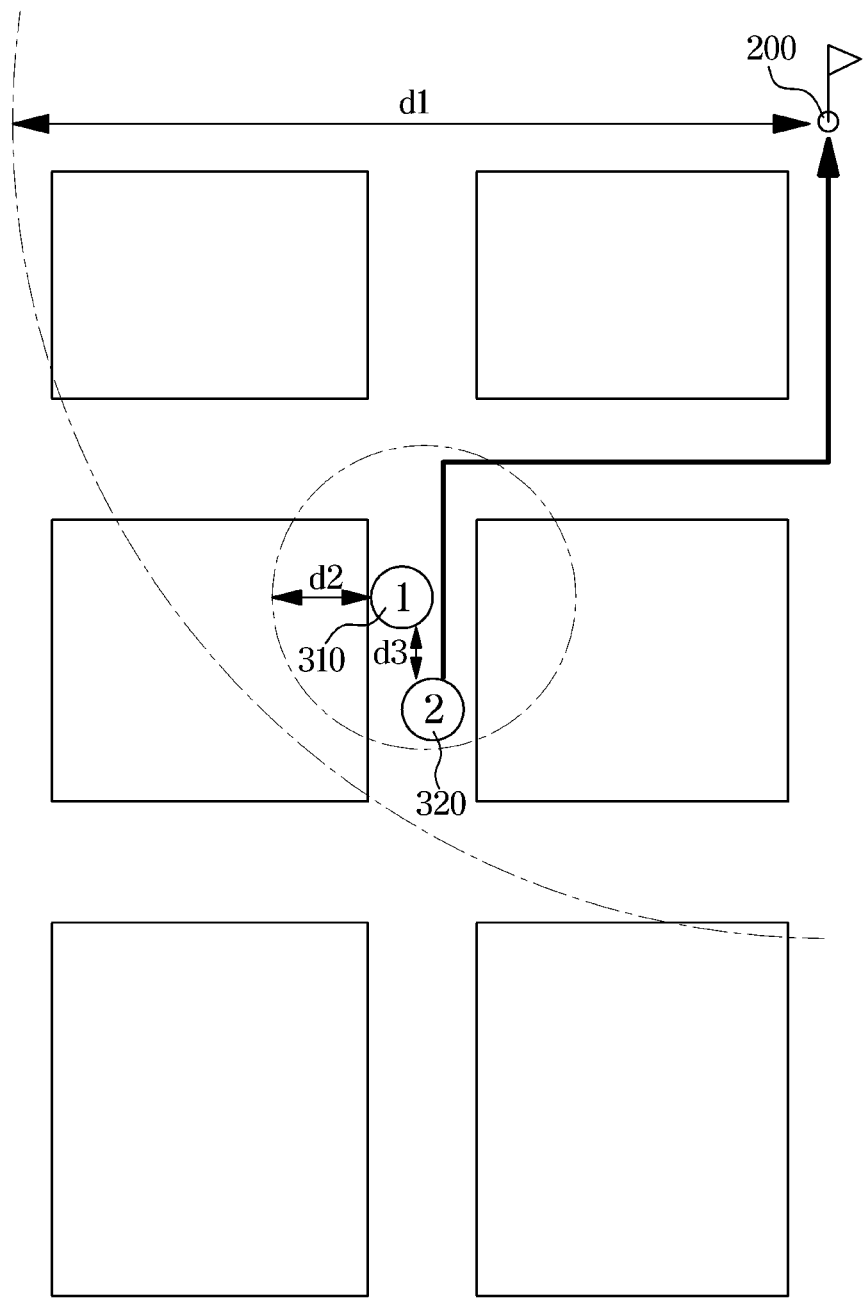

FIGS. 3 and 4 illustrate a case in which a predicted position based on point cloud map information 165 and a predicted position indicated by a GPS signal are compared by the vehicle 100 according to the embodiment.

Referring to FIGS. 3 and 4, the vehicle 100 according to the embodiment may compare the feature points of the front image 115 with the point cloud map information 165 to determine a first predicted position 310 of the vehicle 100.

In this case, the vehicle 100, according to an embodiment, may compare the feature points of the front image 115 with point cloud map information 165 only when the speed of the vehicle 100 is less than or equal to a predetermined speed (e.g., 30 km/h) to determine the first predicted position 310 of the vehicle 100. The front image 115 obtained at a high speed of the vehicle 100 may be inaccurate, and when feature points of the inaccurate front image 115, are compared with the point cloud map information 165, an inaccurate position may be predicted as the position of the vehicle 100. That is, the vehicle 100 may determine the first predicted position 310 only when the speed of the vehicle 100 is less than or equal to the predetermined speed, thereby increasing the accuracy of determining the first predicted position 310.

In addition, the vehicle 100 may determine a position indicated by the GPS signal as a second predicted position 320 of the vehicle 100.

The vehicle 100 may determine one of the first predicted position 310 and the second predicted position 320 indicated by the GPS signal as the position of the vehicle 100 based on the difference between the first predicted position 310 and the second predicted position 320 of the vehicle 100, and control the display module 150 to display an AR image for guiding a route to the destination 200 based on the determined position.

For example, as shown in FIG. 3, the vehicle 100 may, when a distance $d_3$ between the first predicted position 310 and the second predicted position 320 is greater than or equal to a predetermined error distance $d_2$, determine the first predicted position 310 as the position of the vehicle 100, and control the display module 150 to display an AR image for guiding a route to the destination 200 based on the first predicted position 310.

That is, the vehicle 100 may, when a difference between the first predicted position 310 obtained based on the point cloud map information 165 and the second predicted position 320 obtained based on the GPS signal is great, determine that the GPS signal is inaccurate, and perform a route guidance based on the first predicted position 310.

As described above, GPS signals may be slightly inaccurate, and with the GPS signals, route guidance of the vehicle 100 may be smoothly performed when the position of the vehicle 100 is distant from the destination, but when the position of the vehicle 100 is adjacent to the destination, it may be determined that the vehicle 100 has arrived at the destination, and the route guidance may be terminated.

Accordingly, the vehicle 100 according to the disclosure may be configured to, upon entering a predetermined range $d_1$ (e.g., 2 km) of the destination 200, compare the first predicted position 310 obtained based on the point cloud map information 165 with the second predicted position 320 obtained based on the GPS signal to determine the accuracy of the GPS signal, and when the GPS signal is determined to be inaccurate, determine the first predicted position 310 based on more accurate point cloud map information as the current position of the vehicle 100, and perform a route guidance.

In addition, referring to FIG. 4, the vehicle 100 may be configured to, when the distance $d_3$ between the first predicted position 310 and the second predicted position 320 is less than the predetermined error distance $d_2$, determine the second predicted position 320 as the position of the vehicle 100, and control the display module 150 to display an AR image for guiding a route to the destination 200 based on the second predicted position 320.

That is, the vehicle 100 may, when the distance $d_3$ between the first predicted position 310 and the second predicted position 320 is less than the predetermined error distance $d_2$, determine that the GPS signal is accurate, and may provide a route guidance based on the second predicted position 320 obtained based on the GPS signal.

In this case, the vehicle 100 may be configured to, in response to the vehicle 100 being located within the predetermined range of the destination, determine and compare the first predicted position 310 and the second predicted position 320 in real time to determine the position of the vehicle 100.

In addition, in the determining of the first predicted position 310 as the position of the vehicle 100, the vehicle 100, according to an embodiment, may determine, as the position of the vehicle 100, the first predicted position 310 determined for a predetermined time in real time. That is, the vehicle 100 may compare the first predicted position 310 with the second predicted position 320 and, when the GPS signal is determined to be inaccurate, determine the first predicted position 310 obtained based on the point cloud map information 165 for a predetermined time as the position of the vehicle 100 and perform a route guidance, thereby minimizing interference from inaccurate GPS signals.

The above description has been made in relation that the vehicle 100 compares the front image 115 with the point cloud map information 165 to determine the first predicted position 310. However, according to embodiments, the vehicle 100 may receive information about the first predicted position 310 from an external server. Specifically, the vehicle 100 may, in response to determining that the vehicle 100 enters a predetermined range of the destination, control the communication module 130 to transmit a front image to the external server and determine a position indicated by position information received from the external server through the communication module 130 as the first predicted position 310. In this case, the external server may compare feature points of the front image received from the vehicle 100 with the stored point cloud map information to determine position information including a predicted position of the vehicle 100, and transmits the position information to the vehicle 100. In this case, the vehicle 100 may not store the point cloud map information 165.

In the above, an example in which the vehicle 100 determines one of the first predicted position 310 obtained based on the point cloud map information 165 and the second predicted position 320 obtained based on the GPS signal as the position of the vehicle 100 has been described in detail. Hereinafter, an example of displaying an AR image for guiding the route to the destination based on the determined position of the vehicle 100 will be described in detail.

Figure 5:
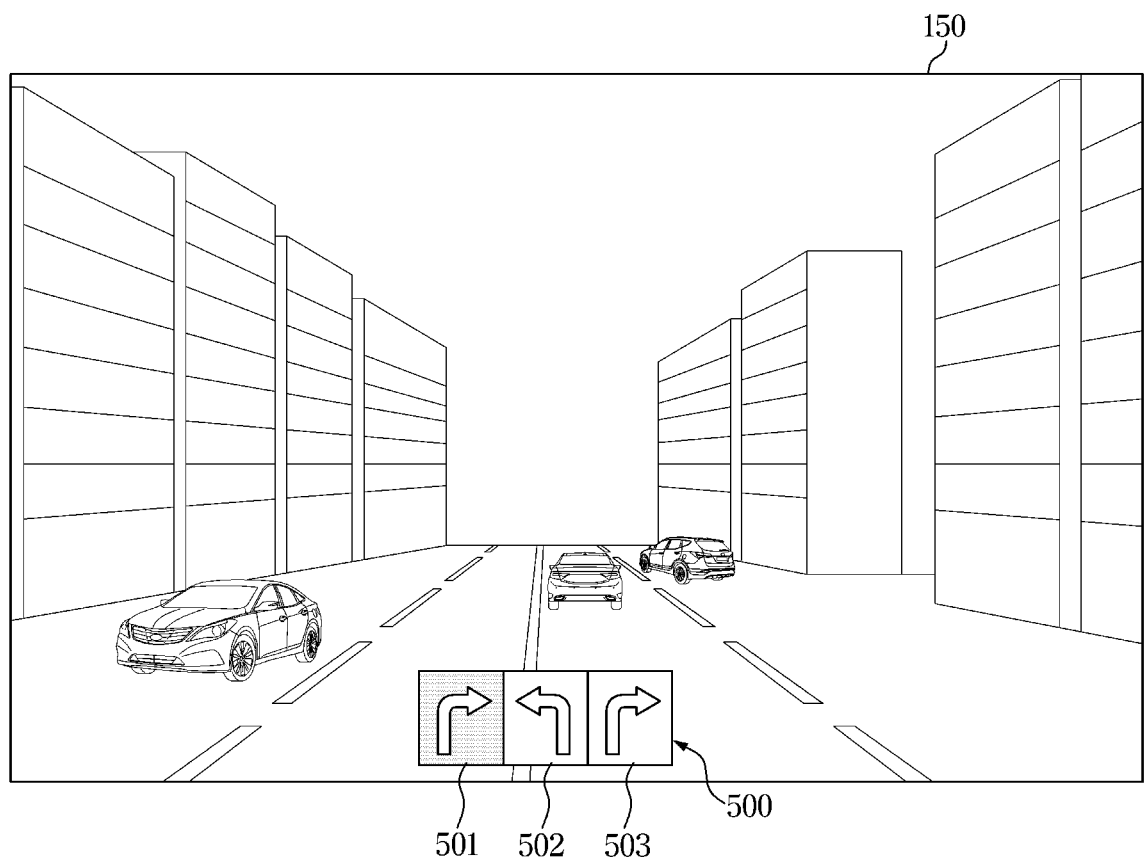
FIG. 5 illustrates a case in which a vehicle displays a turn by turn (TBT) preview image according to an embodiment.

FIG. 5 illustrates a case in which a vehicle displays a turn by turn (TBT) preview image according to an embodiment.

Referring to FIG. 5, the vehicle 100 according to the embodiment may control the display module 150 to display a turn by turn (TBT) preview image 500, which guides a moving direction on at least one junction adjacent to the position of the vehicle 100 among a plurality of junctions located between the position of the vehicle 100 and the destination 200, to be overlaid on a front image.

The vehicle 100, according to an embodiment, may control the display module 150 such that a moving direction guide icon corresponding to a junction located at a shorter distance to the position of the vehicle 100 is arranged further left in the TBT preview image 500.

For example, referring to FIG. 5, the TBT preview image 500 may include moving direction guide icons 501, 502, and 503 for three junctions close to the position of the vehicle 100, and, the moving direction guide icon 501 arranged on the leftmost may guide the moving direction at a junction having the shortest distance from the position of the vehicle 100 among the three junctions, and the moving direction guide icon 502 arranged on the middle may guide the moving direction at a junction having a farther distance from the vehicle 100 than the junction corresponding to the moving direction guide icon 501 arranged on the leftmost, and the moving direction guide icon 503 arranged on the rightmost may guide the moving direction at a junction having a farther distance from the vehicle 100 than the junction corresponding to the moving direction guide icon 502 arranged on the middle.

In addition, the vehicle 100 may control the display module 150 to display the icon 501 corresponding to the junction having the shortest distance from the position of the vehicle 100 in a color (e.g., blue) different from those of the icons 502 and 503 corresponding to the other junctions.

In this case, the vehicle 100 may, upon passing the closest junction, remove the icon 501 corresponding to the closest junction, and update the TBT preview image 510 with icons corresponding to at least one junction adjacent to the position of the vehicle 100.

However, when the vehicle 100 arrives at the destination and there is no junction, the TBT preview image 510 may not be displayed.

Figure 6:
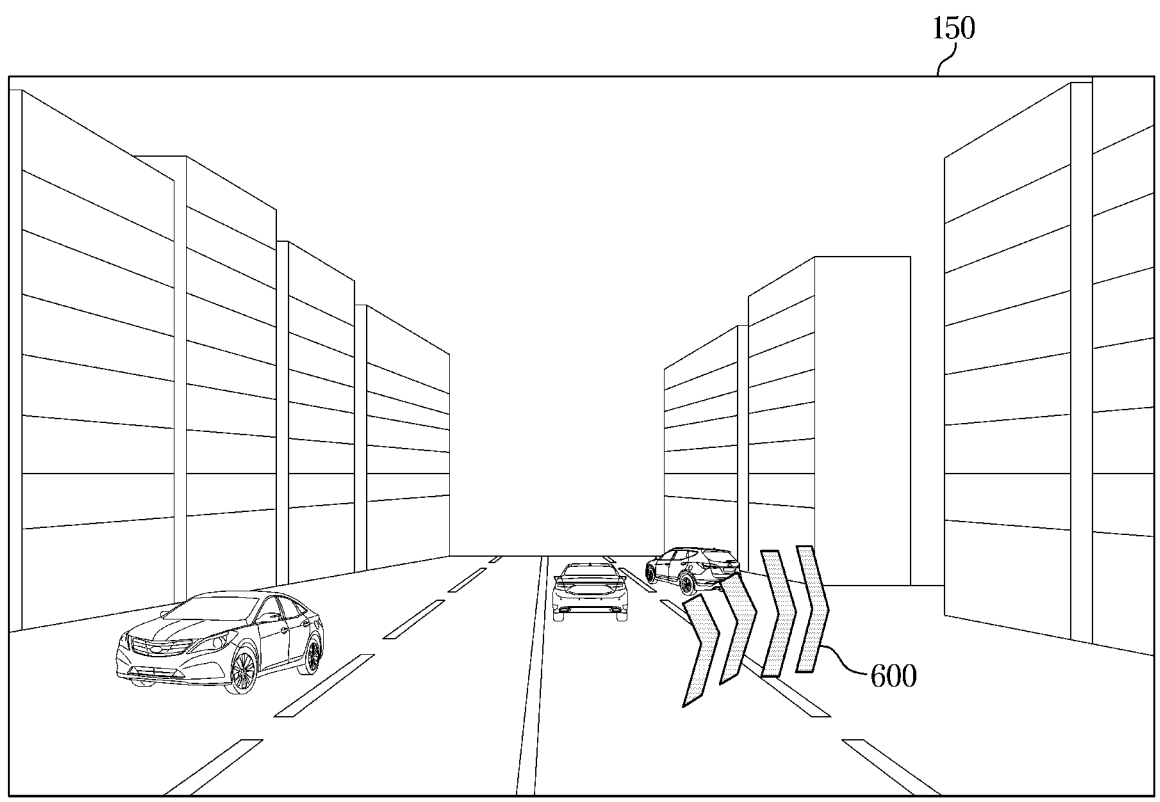
FIG. 6 illustrates a case in which a vehicle according to an embodiment displays a first augmented reality (AR) image in the form of an arrow at a junction.

FIG. 6 illustrates a case in which the vehicle 100 according to the embodiment displays a first augmented reality image in the shape of an arrow at a junction.

Referring to FIG. 6, the vehicle 100 according to the embodiment may be configured to, when it is determined that the position of the vehicle 100 is within a predetermined range (100 m) of a junction on a route to the destination, control the display module 150 to display a first AR image 600 in the shape of an arrow pointing in a moving direction at the junction to be overlaid on the front image.

Figure 7:
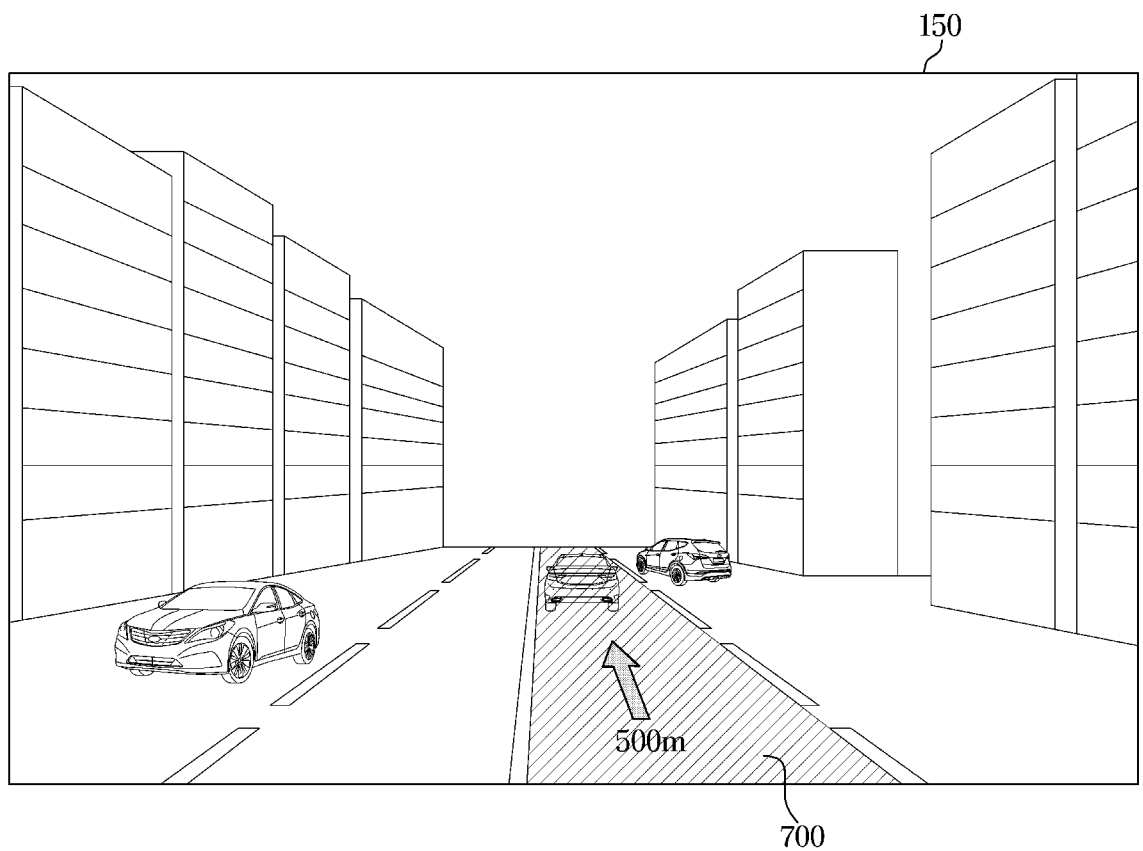
FIGS. 7 and 8 illustrate a case in which a vehicle according to an embodiment displays a second AR image in the form of a carpet covering the ground of a travel lane.
Figure 8:
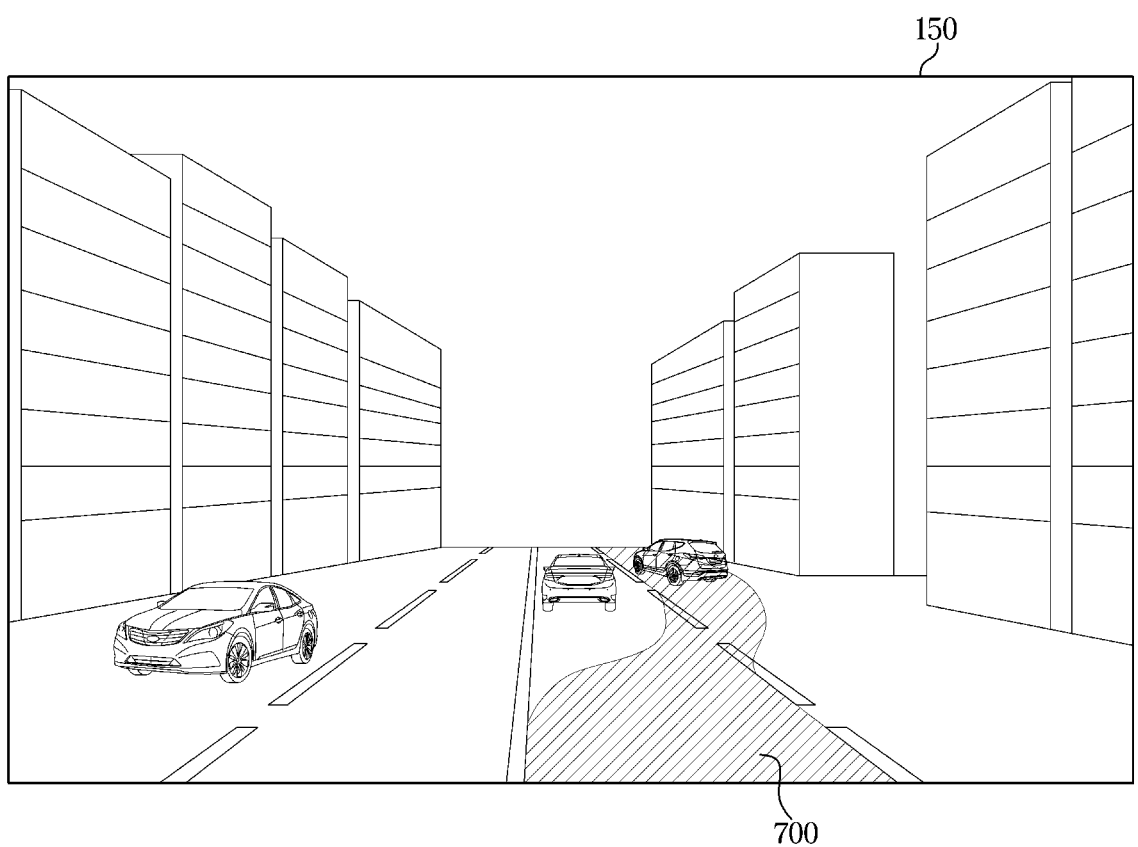

FIGS. 7 and 8 illustrate a case in which the vehicle 100 according to the embodiment displays a second augmented reality image in the form of a carpet covering the ground of a travel lane.

Referring to FIG. 7, the vehicle 100 according to the embodiment may control the display module 150 to display a second AR image 700 in the shape of a carpet covering the ground of a travel lane at the position of the vehicle 100 to be overlaid on the front image.

In addition, the vehicle 100, according to an embodiment, may control the display module 150 to display the remaining distance to the junction and the travel direction to be overlaid on the center of the second AR image 700.

In this case, the vehicle 100, according to an embodiment, may adjust at least one of a color or a transparency of the second AR image 700 based on the speed of the vehicle 100. For example, the vehicle 100 may adjust the second AR image 700 to be blue when the speed of the vehicle 100 is less than a speed limit, and when the speed of the vehicle 100 is greater than or equal to the speed limit, adjust the second AR image 700 to be red. In addition, the vehicle 100 may adjust the transparence to increase when the vehicle 100 is stopped. In addition, the vehicle 100, according to an embodiment may be configured to, when stopped according to a stop signal, process the front image and display an AR image on an area corresponding to a crosswalk in the front image to provide a guidance on the crosswalk.

In addition, referring to FIG. 8, the vehicle 100 according to an embodiment may be configured to, when changing lanes of the vehicle 100, determine the second AR image 700 in a shape that connects the ground surface of a travel lane before the lane change and the ground surface of a travel lane after the lane change. In this case, the point at which the ground surface of the travel lane before the lane change is switched to the ground surface of the travel lane after the lane change in the second AR image 700 may be located at a predetermined distance (e.g., 20 m) from the driver's view point.

In the above, an example in which the vehicle 100 displays the TBT preview image 510, the first AR image 600, and the second AR image 700 has been described in detail. In this case, the TBT preview image 510, the first AR image 600, and the second AR image 700 may each be provided as separate layers or components, and the vehicle 100 according to an embodiment may control the display module 150 to display at least one of the TBT preview image 510, the first AR image 600, and the second AR image 700.

Hereinafter, an embodiment of a method of controlling a vehicle 100 according to an aspect will be described. The vehicle 100 according to the above-described embodiment may be used for the method of controlling the vehicle 100. Accordingly, the contents described above with reference to FIGS. 1 to 8 may be equally applied to the method of controlling the vehicle 100.

Figure 9:
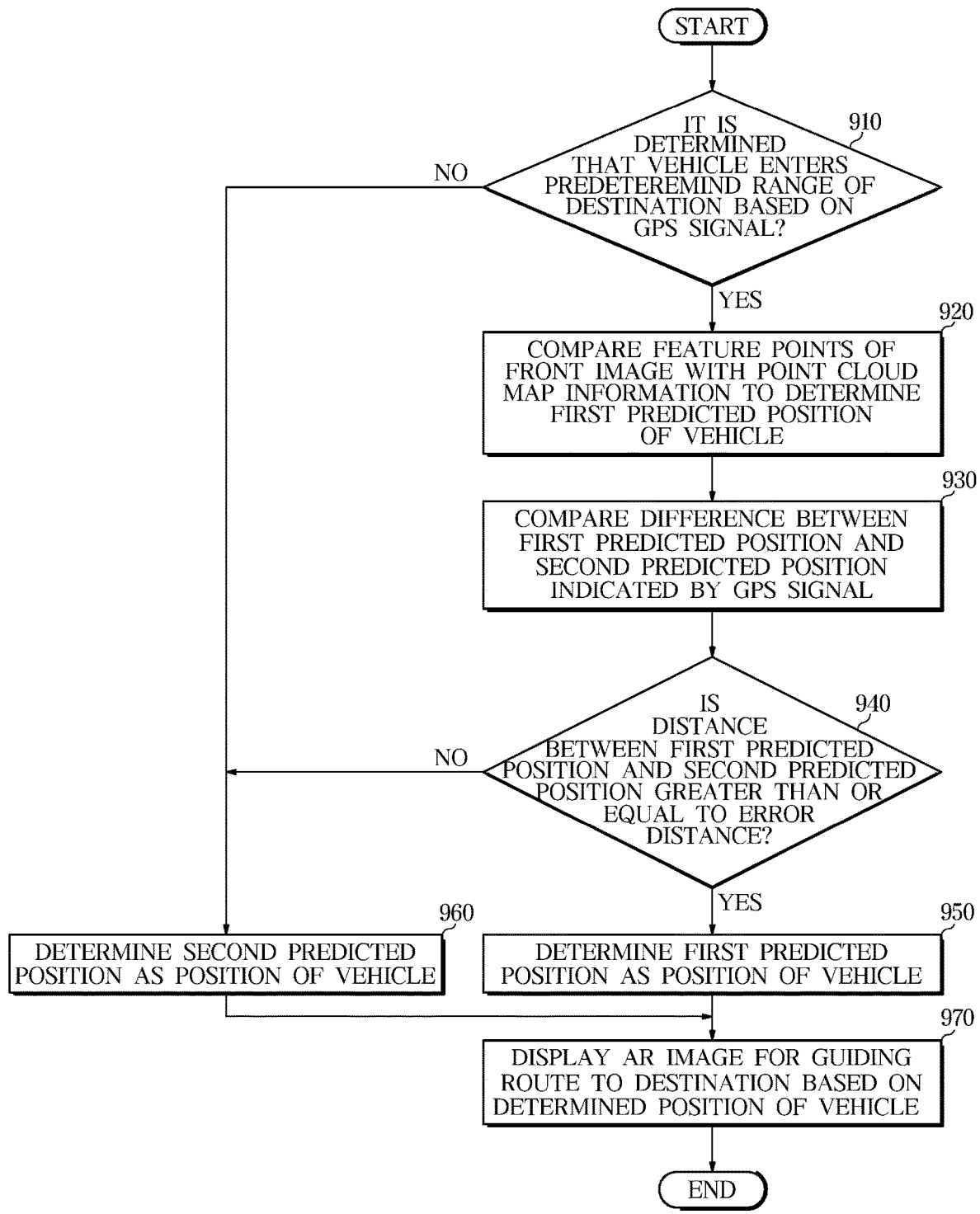
FIG. 9 is a flowchart showing a case in which route guidance is performed using one of a point cloud and a GPS signal in the last mile in a method of controlling a vehicle according to an embodiment.

FIG. 9 is a flowchart showing a case in which route guidance is performed using one of a point cloud and a GPS signal in the last mile in a method of controlling a vehicle according to an embodiment.

Referring to FIG. 9, when the vehicle 100 according to the embodiment may, when it is determined that the vehicle 100 enters a predetermined range of the destination 200 based on a GPS signal (YES in operation 910), compare the feature points of the front image 115 with the point cloud map information 165 to determine the first predicted position 310 of the vehicle 100 (920).

The vehicle 100 according to the embodiment may, when it is determined that the vehicle 100 has not entered the predetermined range of the destination 200 based on the GPS signal (NO in operation 910), determine the second predicted position 320 of the vehicle 110 indicated by GPS signals as the position of the vehicle 100 (960), and display an AR image for guiding a route to the destination 200 based on the determined position of the vehicle 100 (970).

In addition, the vehicle 100 may compare the difference between the first predicted position 310 and the second predicted position 320 of the vehicle 100 indicated by the GPS signal (930).

The vehicle 100 according to the embodiment may, when the distance $d_3$ between the first predicted position 310 and the second predicted position 320 is greater than or equal to the error distance $d_2$ (Yes in operation 940), determine the first predicted position 310 as the position of the vehicle 100 (950), and display an AR image for guiding a route to the destination 200 based on the determined position of the vehicle 100 (970).

In addition, the vehicle 100 according to the embodiment may, when the distance $d_3$ between the first predicted position 310 and the second predicted position 320 is less than the error distance $d_2$ (No in operation 940), determine the second predicted position 320 as the position of the vehicle 100 (960), and display an AR image for guiding a route to the destination 200 based on the determined position of the vehicle 100 (970).

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

As is apparent from the above, the vehicle and the method of controlling the same can, when entering a predetermined range of a destination, determine a predicted position of the vehicle using point cloud map information, compare the predicted position with a predicted position of the vehicle indicated by a global positioning system (GPS) signal to determine a more accurate position of the vehicle, thereby more accurately guiding a route to the destination in the last mile.

Although embodiments of the present disclosure have been described for illustrative purposes, those skilled in the art will appreciate that various modifications, additions and substitutions are possible, without departing from the scope and spirit of the disclosure. Therefore, embodiments of the present disclosure have not been described for limiting purposes.

What is claimed is:

1. A vehicle comprising:
a communication module;
a display module;
an image sensor; and
a controller configured to:
    acquire, through the image sensor, a front image of the vehicle;
    determine that the vehicle enters a predetermined range of a destination based on a global positioning system (GPS) signal received through the communication module;
    compare a feature point of the front image of the vehicle with point cloud map information to determine a first predicted position of the vehicle;
    based on a difference between the first predicted position and a second predicted position of the vehicle, determine one of the first predicted position or the second predicted position as a position of the vehicle, wherein the second predicted position is indicated by the GPS signal;
    determine the second predicted position as the position of the vehicle when a distance between the first predicted position and the second predicted position is less than a predetermined error distance;
    control the display module to display an augmented reality (AR) image for performing a route guidance to the destination based on the determined position of the vehicle, wherein the AR image includes the front image of the vehicle; and
    control the display module to display a turn by turn (TBT) preview image to be overlaid on the front image.

2. The vehicle of claim 1, wherein the controller is configured to:
compare a speed of the vehicle with a predetermined speed in response to determining that the vehicle enters the predetermined range of the destination; and
determine the first predicted position as the position of the vehicle when the speed of the vehicle is less than or equal to the predetermined speed.

3. The vehicle of claim 1, wherein the controller is configured to:
control the communication module to transmit the front image of the vehicle to an external server in response to determining that the vehicle enters the predetermined range of the destination; and
determine a position indicated by position information received from the external server through the communication module as the first predicted position.

4. The vehicle of claim 1, wherein the controller is configured to determine the first predicted position as the position of the vehicle when a distance between the first predicted position and the second predicted position is greater than or equal to the predetermined error distance.

5. The vehicle of claim 4, wherein the controller is configured to determine the first predicted position as the position of the vehicle for a predetermined interval of time in real time.

6. The vehicle of claim 1, wherein the controller is configured to control the display module to display the turn by turn (TBT) preview image to be overlaid on the front image, the TBT preview image providing a direction of a movement on at least one junction adjacent to the determined position of the vehicle among a plurality of junctions located between the determined position of the vehicle and the destination.

7. The vehicle of claim 1, wherein the controller is configured to control the display module to display a first AR image in a shape of an arrow pointing to a direction of movement at a junction when it is determined that, based on the determined position of the vehicle, the vehicle has entered a predetermined range of the junction located on a route to the destination, the first AR image to be overlaid on the front image of the vehicle.

8. The vehicle of claim 1, wherein the controller is configured to:
    control the display module to display a second AR image in a shape of a carpet covering a ground surface of a travel lane at the determined position of the vehicle, the second AR image to be overlaid on the front image of the vehicle; and
    adjust at least one of a color or a transparency of the second AR image based on a speed of the vehicle.

9. The vehicle of claim 8, wherein the controller is configured to determine the second AR image in a shape that connects the ground surface of the travel lane before a lane change and the ground surface of the travel lane after the lane change.

10. A method for controlling a vehicle including a communication module, a display module, and an image sensor for acquiring a front image of the vehicle, the method comprising:
    acquiring, through the image sensor, a front image of the vehicle;
    determining that the vehicle enters a predetermined range of a destination based on a global positioning system (GPS) signal received through the communication module;
    comparing a feature point of the front image of the vehicle with point cloud map information to determine a first predicted position of the vehicle;
    based on a difference between the first predicted position and a second predicted position of the vehicle, determining one of the first predicted position or the second predicted position as a position of the vehicle, wherein the second predicted position is indicated by the GPS signal and wherein determining the one of the first predicted position or the second predicted position as the position of the vehicle comprises determining the second predicted position as the position of the vehicle when a distance between the first predicted position and the second predicted position is less than a predetermined error distance;
    controlling the display module to display an augmented reality (AR) image for performing a route guidance to the destination based on the determined position of the vehicle, wherein the AR image includes the front image of the vehicle; and
    controlling the display module to display a turn by turn (TBT) preview image to be overlaid on the front image.

11. The method of claim 10, wherein determining the one of the first predicted position and the second predicted position as the position of the vehicle comprises:
    comparing a speed of the vehicle with a predetermined speed in response to determining that the vehicle enters the predetermined range of the destination; and
    determining the first predicted position when the speed of the vehicle is less than or equal to the predetermined speed.

12. The method of claim 10, wherein determining the one of the first predicted position and the second predicted position as the position of the vehicle comprises:
    controlling the communication module to transmit the front image of the vehicle to an external server in response to determining that the vehicle enters the predetermined range of the destination; and
    determining a position indicated by position information received from the external server through the communication module as the first predicted position.

13. The method of claim 10, wherein determining the one of the first predicted position and the second predicted position as the position of the vehicle comprises determining the first predicted position as the position of the vehicle when a distance between the first predicted position and the second predicted position is greater than or equal to the predetermined error distance.

14. The method of claim 13, wherein determining the first predicted position as the position of the vehicle comprises determining the first predicted position for a predetermined interval of time in real time.

15. The method of claim 10, further comprising controlling the display module to display the turn by turn (TBT) preview image to be overlaid on the front image of the vehicle, the TBT preview image providing a direction of movement on at least one junction adjacent to the determined position of the vehicle among a plurality of junctions located between the determined position of the vehicle and the destination.

16. The method of claim 10, wherein controlling the display module comprises controlling the display module to display a first AR image in a shape of an arrow pointing to a direction of movement at a junction when it is determined that, based on the determined position of the vehicle, the vehicle has entered a predetermined range of the junction located on a route to the destination, the first AR image to be overlaid on the front image of the vehicle.

17. The method of claim 10, wherein controlling the display module comprises controlling the display module to display a second AR image in a shape of a carpet covering a ground surface of a travel lane at the determined position of the vehicle, the second AR image to be overlaid on the front image of the vehicle, and adjusting at least one of a color or a transparency of the second AR image based on a speed of the vehicle.

18. The method of claim 17, wherein controlling the display module to display the AR image comprises determining the second AR image in a shape that connects the ground surface of the travel lane before a lane change and the ground surface of the travel lane after the lane change.

19. A vehicle comprising:
    a communication module;
    a display module;
    an image sensor; and
    a controller configured to:
        acquire, through the image sensor, a front image of the vehicle;
        determine that the vehicle enters a predetermined range of a destination based on a global positioning system (GPS) signal received through the communication module;
        compare a feature point of the front image of the vehicle with point cloud map information to determine a first predicted position of the vehicle;
        based on a difference between the first predicted position and a second predicted position of the vehicle, determine one of the first predicted position or the second predicted position as a position of the vehicle, wherein the second predicted position is indicated by the GPS signal;

determine the first predicted position as the position of the vehicle when a distance between the first predicted position and the second predicted position is greater than or equal to a predetermined error distance;

determine the first predicted position as the position of the vehicle for a predetermined interval of time in real time; and control the display module to display an augmented reality (AR) image for performing a route guidance to the destination based on the determined position of the vehicle, wherein the AR image includes the front image of the vehicle.

\* \* \* \* \*

UNITED STATES PATENT AND TRADEMARK OFFICE
CERTIFICATE OF CORRECTION

PATENT NO.         : 12,345,540 B2
APPLICATION NO.    : 17/807301
DATED              : July 1, 2025
INVENTOR(S)        : Woo et al.

It is certified that error appears in the above-identified patent and that said Letters Patent is hereby corrected as shown below:

In the Claims

In Column 13, in Claim 10, Lines 28-29, delete "sensor for acquiring a front image of the vehicle," and insert -- sensor, --.

Signed and Sealed this
Twelfth Day of August, 2025

Coke Morgan Stewart
*Acting Director of the United States Patent and Trademark Office*